Patented Dec. 30, 1952

2,623,897

UNITED STATES PATENT OFFICE 2,623,897

PROCESS FOR THE PREPARATION OF GALLIC ACID ESTERS OF ALCOHOLS HAVING AT LEAST 7 CARBON ATOMS

Gerrit J. M. van der Kerk, Utrecht, Netherlands, assignor to Nederlandse Centrale Organisatie voor Toegepast-Natuurwetenschappelijk Onderzoek, The Hague, Netherlands, and N. V. Chemische Fabriek "Naarden" Naarden, Netherlands, both corporations of the Netherlands No Drawing. Application June 8, 1949, Serial No. 97,918. In the Netherlands June 28, 1948

5 Claims. (Cl. 260—473)

The esters of gallic acid are well-known and are used, among other purposes, as antioxidants in the preservation of fats and oils. Until recently no higher esters than the hexyl ester ($n=6$) were described in the literature, which esters could be prepared by the classical methods of esterification. These classical methods failed, in the preparation of higher esters, wherein $n$ is higher than 6.

Morris and Riemenschneider (J. Am. Chem. Soc. 68 (1946), 500) described a preparation of a series of gallic acid esters of normal fatty alcohols ($n=8, 12, 14, 16$ and $18$) by a method, which is based upon a process developed at the time by Emil Fischer for the preparation of carboxy derivatives of aromatic hydroxy acids (Ber. 41 (1908), 2875). The higher gallic esters were synthetized by a circuitous route under temporary protection of the phenolic hydroxy groups. However, this method is very cumbersome and therefore is not suitable for the preparation of greater quantities of the esters.

In the Dutch patent application No. 133,574, not published before the date of the present application, a preparation of higher gallic acid esters by way of the previously unknown galloyl chloride was described.

The steadily growing importance of the higher gallic acid esters however, causes a direct method of esterification to be much sought after.

In a publication of Ault, Weil, Nutting and Cowan (J. Am. Chem. Soc. 69 (1947), 2003) a direct method of esterification is described, in which higher fatty alcohols ($n=8, 12, 14, 16$ and $18$) are esterified with gallic acid in a medium composed of a high-boiling, polar, inert solvent, which distills azeotropically with water, and in the presence of an esterifying catalyst. The best yields are obtained with a mixture of anisol and nitrobenzene. The authors also discuss the problem of why the esterification reaction between gallic acid and the higher alcohols is not smooth. According to the authors, the gallic acid exists in solution in a dimeric form, as a so-called chelate molecule, in which the carboxylic groups of two gallic acid molecules mutually coordinate. Now the lower alcohols ($n=1-6$ included) are said to be able to split up this chelate bond because of their high dielectric constant and then to esterify the monomeric gallic acid molecules. The higher alcohols are supposed to be unable to split up the dimer on account of their low dielectric constant and the direct esterification is therefore supposed to be hampered by the absence of reactive gallic acid. By carrying out the esterification reaction in a medium composed of a high-boiling, polar, water carrier, i. e. anisol, and a high-boiling compound having a high dielectric constant, i. e. nitrobenzene, the direct esterification indeed could be performed according to the authors.

The necessity of using a mixture of two solvents, one of which (nitrobenzene), moreover, renders a very persistently clinging odor to the final products, which odor can be removed only after very thorough purification, undoubtedly constitutes a technical disadvantage of this method, which apart from that is very useful.

Surprisingly, it has now been found that it is not necessary at all to use high-boiling polar solvents. According to the present invention the esterification of gallic acid with higher alcohols may be carried out in a direct way, in the presence of an esterifying catalyst, using a quantity of an inert, non-polar solvent, distilling azeotropically with water.

This process permits the practical preparation, at comparatively low cost, of higher gallates. The use by the present process of rather costly substances like anisol or phenetol, is superfluous and one can use the normal non-polar "water-carriers," such as benzene, toluene and xylene. A proper choice of the non-polar "water-carrier" and the controlling of the ratio of alcohol "water-carrier" permits the esterification to be carried out at any desired temperature, including a boiling temperature of the reaction mixture below 100° C. In order to obtain a quick esterification, the working temperature will advantageously be above 150° C. and preferably between 180 and 200° C. If the temperature rises during the reaction it may be maintained within the desired range by the addition of more solvent.

As catalysts, the usual esterifying catalysts may be used, preferably, however, those, which by their very nature are soluble in an organic reaction medium, such as the sulfonic acids of aromatic hydrocarbons, for example paratoluene sulfonic acid, $\beta$-naphthalene sulfonic acid and the like.

The reaction is preferably carried out continuously in such a way that the distillate of solvent carrying the water is separated in a separator into a water and a solvent layer and the solvent is continuously returned to the reaction vessel. Preferably, the reaction is started with an excess of the alcohol. As soon as the condensing solvent is clear, the quantity of gallic acid originally present is esterified.

The reaction mixture may now be worked up for ester recovery. Advantageously, however, after the mixture has become homogeneous after a short time of boiling, additional gallic acid is added and the process repeated. In order to get a quick esterification care should be taken that the boiling point of the reaction mixture remains at least 150° and preferably 180–200° C. This can be accomplished by the addition of an additional quantity of the inert non-polar solvent. In this way one may continue, until a quantity of gallic acid almost equivalent to the original quantity of alcohol has been added.

This process permits a practically complete esterification of the higher alcohol. The yields with this method of esterification vary from 80 to 95% of the theoretical amount.

It is recommendable to pass carbon dioxide or another inert gas through the reaction mixture during the reaction in order to prevent an oxidative brownish discoloration of the reaction mixture occurring at the high reaction temperature. At lower reaction temperatures this oxidative discoloration is not significant and consequently the bubbling through of carbonic acid or other inert gases during the esterification is superfluous.

Example I

A mixture of 0.1 mol of gallic acid (17.0 g.), 0.5 mol of lauryl alcohol (93 g.), 23 g. of xylene (25% by weight of the alcohol) and 0.8 g. of $\beta$-naphthalene sulfonic acid is boiled in an apparatus for continuous esterification, for 3–5 hours, with carbon dioxide bubbling through the reaction mixture. The temperature of the liquid is maintained at about 200° C. during this treatment. The xylene distills through a simple fractionating column, carrying with it the reaction water. After separation of the distillate into a water and a xylene phase by means of a Dean and Stark separator, the xylene is returned continuously to the reaction vessel. As soon as the xylene is condensed in a clear state, the reaction is complete.

At the start of the reaction a fairly high excess of lauryl alcohol is desirable, to make boiling of the reaction mixture possible. Reduction of the quantity of alcohol by the simultaneous addition of more xylene, is disadvantageous because it causes lowering of the reaction temperature and consequently a considerable prolongation of the reaction time. However, by starting the reaction with the quantities used in this example, the reaction mixture becomes homogeneous after boiling for a short time. An additional 0.1 mol of gallic acid may then be added and as much xylene as is necessary to keep the boiling temperature of the reaction mixture at about 200° C. After the mixture has again become homogeneous this procedure may be repeated until a total quantity of gallic acid equivalent to the original lauryl alcohol has been added.

The further esterification and the working up of the reaction mixture is carried out in the usual way. The yield of lauryl gallate amounts to 91% of the theoretical yield based on gallic acid.

Example II

To a mixture of 1.5 kg. of n-octyl alcohol and 15 g. of 96% sulfuric acid, 0.51 kg. of crude gallic acid having a gallic acid content of 90.4% and 2.5 l. of benzene were successively added. This mixture was heated and water and benzene were distilled in a column. The starting temperature of the reaction mixture was 88° C. the final temperature 90° C. The total amount of water distilled was 130 cm.³ After cooling, the reaction mixture was washed with water, then with a solution of sodium bicarbonate, and finally once more with water. The benzene was distilled from a water bath under reduced pressure, and the octyl alcohol under greatly reduced pressure.

To the liquid residue was added 3 l. of carbon tetrachloride, to accomplish purification and crystallization of the gallic acid ester. After filtrating and drying, 0.75 kg. of octyl gallate having a melting point of 94.5–95° C. were obtained. The yield was 93% of theoretical.

Example III

In a manner corresponding to that described in Example I, 0.51 kg. of gallic acid having a gallic acid content of 90.4% was esterified with 1.5 kg. of octyl alcohol, in this case, however, by using 2.5 l. of toluene. The temperature of the reaction mixture during the treatment was 123° C., which temperature rose to 128° C. towards the end of the reaction. The distilled toluene was, after separation of the water, continuously returned to the reaction vessel. A total amount of 120 cm.³ water was collected. The yield of ester was 0.685 kg., i. e. 87.5% of the theory. The melting point of the octyl gallate thus obtained was 94.5–95° C.

What is claimed and desired to be secured by Letters Patent is:

1. A process of preparing higher gallic acid esters which comprises reacting gallic acid with an alkyl alcohol containing more than 6 carbon atoms in the presence of an acid-esterifying catalyst and in an inert non-polar solvent at elevated temperatures, distilling off the reaction water and the solvent, and recovering a higher gallic acid ester.

2. A process of preparing higher gallic acid esters which comprises reacting gallic acid with an alkyl alcohol containing more than 6 carbon atoms in the presence of an acid-esterifying catalyst and in an inert non-polar solvent at a temperature of about 150–200° C., distilling off the reaction water and the solvent, and recovering a higher gallic acid ester.

3. A process of preparing higher gallic acid esters which comprises reacting gallic acid with an alkyl alcohol containing more than 6 carbon atoms in the presence of an acid-esterifying catalyst and in an inert non-polar solvent at a temperature of about 180–200° C., distilling off the reaction water and the solvent, and recovering a higher gallic acid ester.

4. A process of preparing higher gallic acid esters which comprises heating a mixture of gallic acid and an alkyl alcohol containing more than 6 and up to 18 carbon atoms in the presence of an acid-esterifying catalyst and in an inert non-polar solvent so as to start the reaction between said gallic acid and said alcohol, adding additional gallic acid to the reaction mixture after the start of said reaction in an amount about sufficient to completely react with all of the alcohol present in said reaction mixture, distilling off the reaction water and the solvent, and recovering a higher gallic acid ester.

5. A process of preparing higher gallic acid esters which comprises reacting gallic acid with an alkyl alcohol containing more than 6 and up to 18 carbon atoms in the presence of an acid-esterifying catalyst and an inert non-polar solvent at elevated temperatures, distilling off the reaction water and the solvent, separating said reaction water from said solvent, recycling the thus separated solvent into the reaction mixture, and recovering a higher gallic acid ester.

GERRIT J. M. van der KERK.

REFERENCES CITED

The following references are of record in the file of this patent:

UNITED STATES PATENTS

| Number | Name | Date |
|---|---|---|
| 2,198,583 | Grether | Apr. 23, 1940 |
| 2,234,705 | Normington | Mar. 11, 1941 |
| 2,234,706 | Normington | Mar. 11, 1941 |
| 2,249,768 | Kropa | July 22, 1941 |
| 2,448,520 | Cupery | Sept. 7, 1948 |

OTHER REFERENCES

Bergel, Chem. and Ind. (April 1, 1944), pages 127–128

Ault, J. A. C. S., vol. 69 (Aug. 1947), pp. 2003–2005.

Suter, J. A. C. S., vol. 61 (Feb. 1939), page 531.

Russell, J. A. C. S., vol. 68, pp. 500–501.